April 5, 1927.

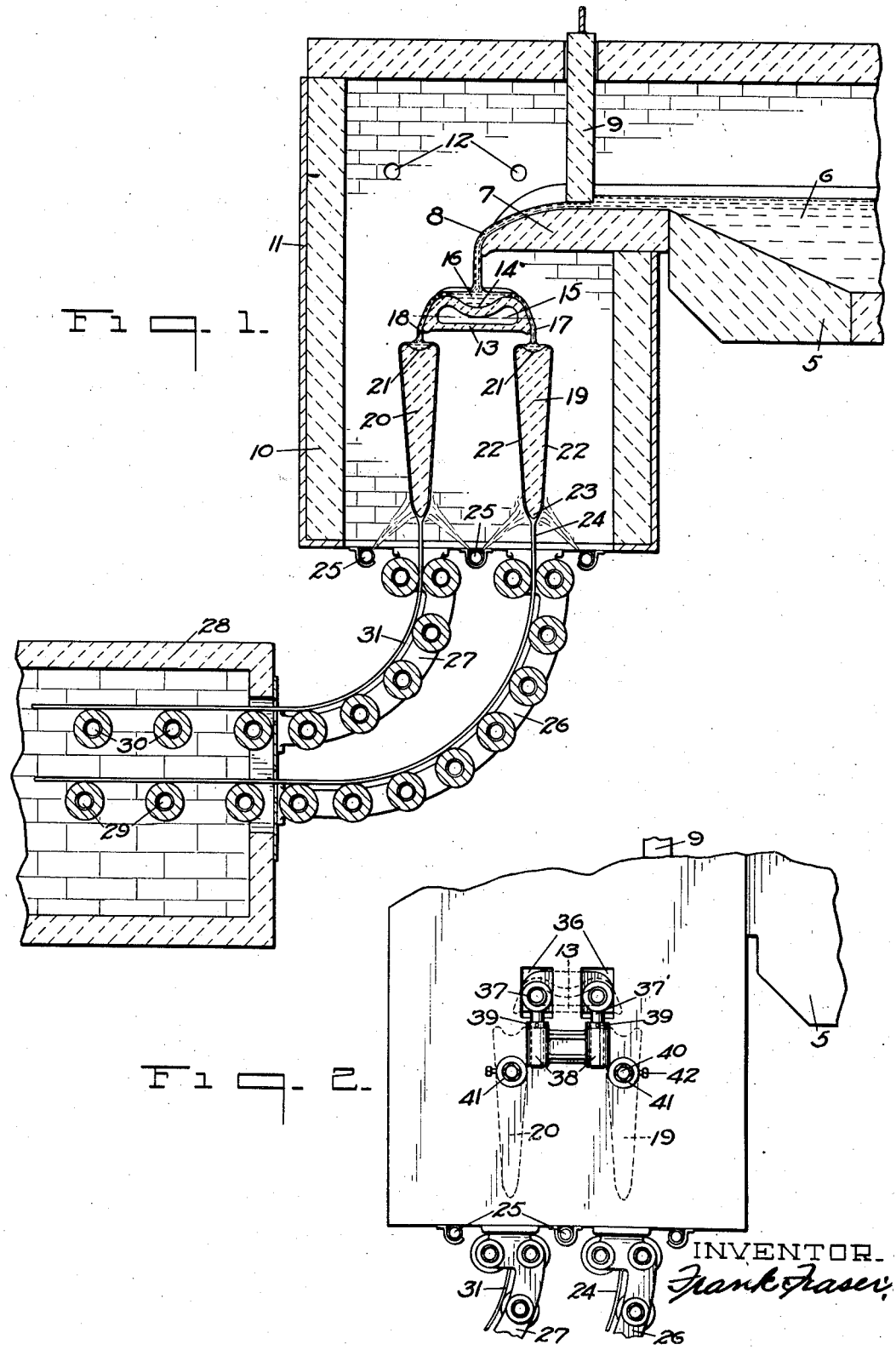

F. FRASER 1,623,051

MULTIPLE SHEET FLOWING APPARATUS

Filed May 16, 1925     2 Sheets-Sheet 2

INVENTOR.
Frank Fraser.

Patented Apr. 5, 1927.

1,623,051

UNITED STATES PATENT OFFICE.

FRANK FRASER, OF TOLEDO, OHIO, ASSIGNOR TO THE LIBBEY-OWENS SHEET GLASS COMPANY, OF TOLEDO, OHIO, A CORPORATION OF OHIO.

MULTIPLE-SHEET-FLOWING APPARATUS.

Application filed May 16, 1925. Serial No. 30,690.

The present invention relates to sheet glass apparatus, and has particular reference to a method and apparatus for producing a plurality of sheets of glass from a single mass of molten glass.

An important object of the invention is to provide a method and apparatus for creating a flow of molten glass, which is divided into a plurality of streams, each of the streams being adapted to be formed into a sheet of glass.

A further object of the invention is to provide a method and apparatus for producing sheet glass, and includes means for creating a downwardly flowing body of glass, said body of glass being adapted to be intercepted and divided into a plurality of streams which are then formed into a plurality of sheets.

A still further object of the invention is to provide an apparatus for producing a plurality of sheets of glass, and includes means for creating a downward flow of glass which is intercepted and supported upon a suitable member which divides the flow into a plurality of streams, each of said streams being received upon and adapted to flow down opposite sides of a slab whereby it is formed into sheet form.

Other objects and advantages of the invention will become apparent during the course of the following description.

In the drawings wherein like numerals are employed to designate like parts throughout the same.

Fig. 1 is a vertical longitudinal sectional view of the apparatus in operation,

Fig. 2 is an end view of a portion thereof,

Figure 3:
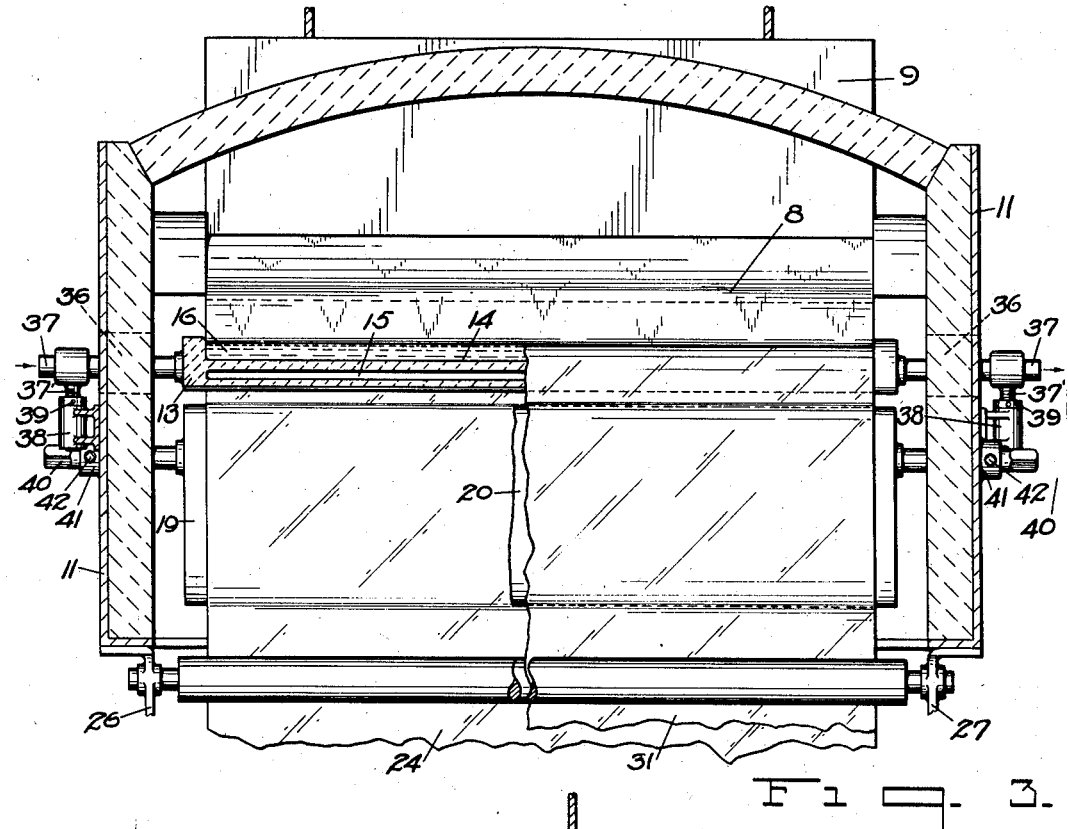
Fig. 3 is a vertical transverse section through a portion of the apparatus.

In the drawings the numeral 5 designates any form of glass tank adapted to contain a mass of molten glass 6. The tank furnace 5 is provided with any form of overflow lip 7 over which is adapted to pass a flow of molten glass 8. The flow 8 may be controlled by the adjustable shear-cake 9 as indicated. Arranged around the discharge lip 7 is a compartment 10 which may be provided with insulating material 11. Burners 12 may be arranged in the compartment to maintain the glass at the desired temperature.

The flow of glass 8 will, due to gravity, fall in substantially a downwardly vertical plane. I provide an intercepting, preferably refractory member 13 which is provided with the longitudinally extending depression or trough 14 as clearly indicated in Fig. 1. The intercepting member or slab 13 may be formed from any desired material such as a refractory clay or any of the well-known non-corrosive alloys such as nichrome, monel, etc. It may be provided with an internal bore 15 by which means it may be internally heated or cooled as desired, depending upon the temperature at which it is desired to maintain the glass. The member is also supported at its ends by adjustable means whereby it may be tilted to one side or the other to control the thickness of the overflow streams which will be more fully described hereinafter.

As is clearly shown in Fig. 1, the flow 8 is intercepted by the member 13 and builds up a small pool of glass 16 in the trough 14. As the glass continues to build up it will overflow the sides thereof into a plurality of streams 17 and 18 respectively.

Arranged below the lower edges of the intercepting member 13 and in spaced relation thereto are preferably wedge-shaped slabs 19 and 20 respectively. The slabs 19 and 20 may be formed from any desired metal or refractory clay, and are both provided with the scooped-out portion or trough 21. The streams of glass 17 and 18 will thus be received within the grooves 21 until they overflow and permit the films of glass 22 to flow down opposite sides of the said slabs. The slabs 19 and 20 will offer the necessary resistance to the films 22 to make them suitable to be reunited at the lower end 23 of the slab to produce the sheet 24. Burners 25 may be used to heat the lower ends of the films upon the end of the slab 23 to insure welding of the films as they leave the slab to produce a single sheet from the two films. The action of the glass on the slab 20 is identical with that upon the slab 19. After the sheets 24 have been formed it is desirable to anneal them, and to accomplish this the carrier ways 26 and 27 are provided to permit the sheet to be deflected from the vertical plane to the horizontal plane. As is shown, a leer 28 is provided with a plurality of sets of rolls 29 and 30 respectively. This is to make it possible to anneal the sheets 24 and 31 in the same leer simultaneously. Obviously, any number of sets of rolls can be provided in the leer dependent upon the number of sheets formed with the apparatus.

To produce more than two sheets additional intercepting members can be provided, thus in Fig. 1, in addition to the intercepting member 13, either one of the streams 17 or 18, or both, can again be intercepted or divided as is done upon the interception member 13. To control the thickness of the sheets formed, the intercepting members and slabs are all mounted upon supports adapted to be adjusted. As is shown, the intercepting member carries the blocks 32, each pivotally associated with a screw-shaft 37, operable in an internally threaded sleeve 38. An adjusting nut 39 is provided to raise or lower the shaft as necessary. Thus either side of the intercepting member or both can be raised or lowered to control the thickness of the stream overflowing the sides. In this manner a comparatively thin stream can be overflowed from one side of the member, while a comparatively thick stream can be overflowed from the opposite side. The same thing holds true for the slabs 19 and 20 which are adjusted by means of the shafts 40 arranged through the sleeves 41, the said shafts being maintained in the desired adjustment by means of the set screws 42. Of course the means of mounting the various parts can be modified as desired to suit various conditions.

Figure 4:
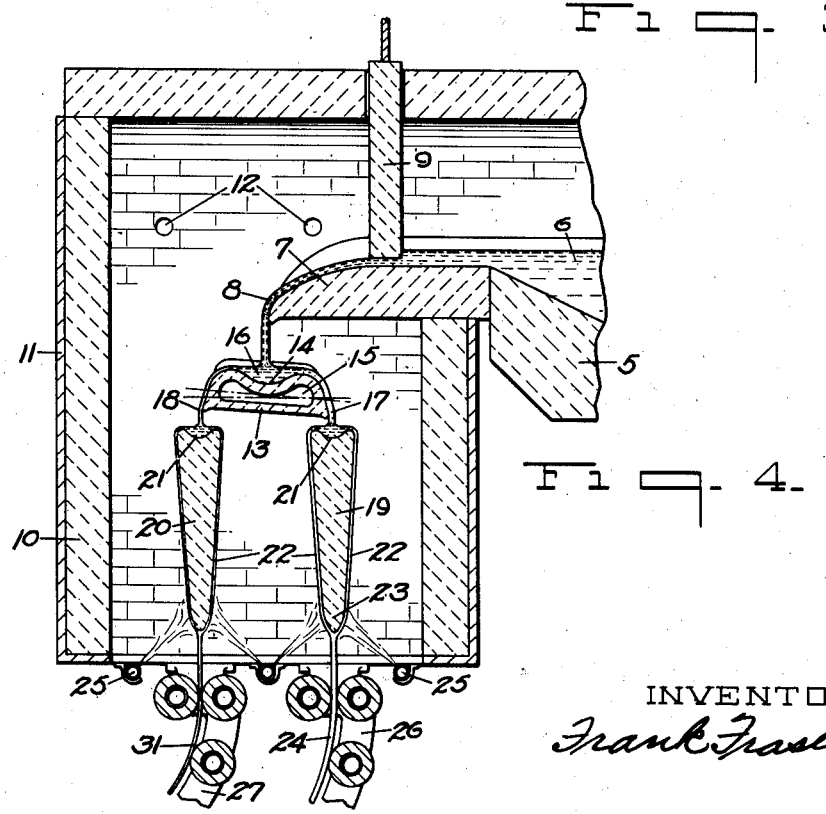
Fig. 4 is a sectional view illustrating various adjustments which may be made to regulate and control the thicknesses of sheet formed.

Fig. 4 clearly shows the intercepting member 13 tilted in a manner to produce a relatively heavy sheet on the right-hand slab, and a comparatively thin sheet on the left-hand slab.

With the construction just described it is possible to form a plurality of sheets from molten glass created in a single furnace. In this way it is possible to speed up production and reduce the cost of operating the tank furnaces. If it is desired the annealing leer may be provided with protecting means between the various sets of rolls to prevent dirt falling from one set of rolls upon the sheet below.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, means to create a downwardly moving flow of molten glass, and means to separate the flow to produce a plurality of sheets of glass.

2. In sheet glass apparatus, means to create a flow of molten glass, means to intercept the flow and to divide it into a plurality of streams, and means for producing a sheet of glass from each stream.

3. In sheet glass apparatus, means to create a downwardly moving flow of molten glass, means to intercept the flow and to divide it into a plurality of streams, and means for producing a sheet of glass from each stream.

4. In sheet glass apparatus, a plurality of sheet forming slabs, and means for supplying both sides of each slab with molten glass from a single tank furnace.

5. In sheet glass apparatus, a furnace containing a mass of molten glass, means to permit the glass to flow therefrom, a plurality of slabs, and means to cause the molten glass to flow down said slabs to produce a plurality of sheets of glass.

6. In sheet glass apparatus, a furnace containing a mass of molten glass, means to permit the glass to flow therefrom, a plurality of slabs, and means to intercept the said flow of glass and divide it into smaller streams which are permitted to flow down the sides of the slabs to produce sheets of glass.

7. In sheet glass apparatus, a furnace containing a mass of molten glass, means to permit a continuous flow of glass therefrom, an intercepting slab, and a plurality of sheet forming slabs arranged beneath said intercepting slab, the flow of glass from the furnace being received upon the intercepting member and divided into streams which flow down the slabs to produce sheets of glass.

8. In sheet glass apparatus, a tank furnace containing a mass of molten glass, means to permit a flow of glass to issue from the furnace, a plurality of slabs, and means for intercepting the flow of glass and dividing it into a plurality of streams which are adapted to flow down said slabs, the intercepting member being adjustably mounted whereby the thickness of the streams can be controlled.

9. In sheet glass apparatus, means to create a downwardly moving flow of molten glass, an intercepting member, and a plurality of slabs arranged beneath the intercepting member whereby streams of glass flowing from the intercepting member will be received upon and flowed down the slabs.

10. In sheet glass apparatus, means to create a downwardly moving flow of molten glass, an intercepting member, and a plurality of slabs arranged beneath the intercepting member whereby streams of glass flowing from the intercepting member will be received upon and flowed down the slabs, the said slabs being adjustably mounted.

11. In sheet glass apparatus, means to create a downwardly moving flow of molten glass, means for dividing the flow into a plurality of smaller streams, means for forming a sheet from each stream, and means for annealing the sheets thus formed.

12. In sheet glass apparatus, means for creating a downwardly moving flow of molten glass, means for dividing the flow into a plurality of smaller streams, means for forming a sheet from each stream, an annealing leer, and means whereby all of the sheets may be simultaneously annealed in the said leer.

13. In sheet glass apparatus, a furnace containing a mass of molten glass, a heated compartment, a plurality of slabs therein, means for flowing molten glass down the surfaces of the slabs to produce a plurality of sheets, and means for annealing the sheets.

14. In sheet glass apparatus, a furnace containing a mass of molten glass, a heated compartment, a plurality of slabs therein, means for flowing molten glass down the surfaces of the slabs to produce a plurality of sheets, and means for annealing the sheets simultaneously.

15. In sheet glass apparatus, a furnace containing a mass of molten glass, means to permit a flow of glass from the furnace, an adjustable intercepting member, a plurality of adjustable slabs arranged in proximity to the intercepting member whereby glass flowing from the furnace will be divided into a plurality of streams, each of the streams flowing upon a slab to produce a plurality of sheets.

16. The process of producing sheet glass, consisting in dividing a downwardly moving flow of glass into a plurality of streams and then flowing each stream into sheet form.

17. The process of producing sheet glass consisting in dividing a flow of molten glass into a plurality of streams, and then flowing each stream down both sides of a slab to produce a sheet.

18. The process of producing a plurality of sheets of glass simultaneously, consisting in separating a flow of molten glass into a plurality of streams, then flowing each stream down surfaces of a slab to produce a plurality of sheets, and then annealing all of the sheets simultaneously.

Signed at Toledo, in the county of Lucas, and State of Ohio, this 13th day of May, 1925.

FRANK FRASER.